United States Patent [19]

Miki

[11] 4,147,591
[45] Apr. 3, 1979

[54] FUEL ASSEMBLY OF FAST BREEDER REACTOR

[75] Inventor: Kazuyoshi Miki, Kawasaki, Japan

[73] Assignee: Hitachi, Ltd., Japan

[21] Appl. No.: 811,140

[22] Filed: Jun. 28, 1977

[30] Foreign Application Priority Data

Jul. 9, 1976 [JP] Japan .................................. 51-80916

[51] Int. Cl.² ............................................. G21C 3/08
[52] U.S. Cl. ......................................... 176/81; 176/68
[58] Field of Search ........................ 176/68, 76, 78, 81

[56] References Cited

U.S. PATENT DOCUMENTS

| | | | |
|---|---|---|---|
| 3,607,642 | 9/1971 | Murdock et al. | 176/81 X |
| 3,930,940 | 1/1976 | Cayol et al. | 176/81 X |
| 3,964,968 | 6/1976 | Kurilkin et al. | 176/81 |
| 3,997,395 | 12/1976 | Cayol et al. | 176/78 |
| 4,038,137 | 7/1977 | Pugh | 176/78 |

Primary Examiner—Peter A. Nelson
Attorney, Agent, or Firm—Craig & Antonelli

[57] ABSTRACT

This invention relates to fuel assembly for Fast Breeder Reactor, such as wire spacer fuel assembly, in which the thickness of cladding tubes in the upper end portion of fuel pins positioned in the peripheral region of the assembly is made larger than that of the remaining portion. Thus, according to the present invention, a bundle of the fuel pins can be restrained from displacement in one direction in the assembly when the fuel pins are deformed by heat and neutron radiation in operation of a nuclear reactor, and further the sectional portion of the fuel pins can be prevented from deformation caused by a load externally operated on the fuel pins. Furthermore, the thickness of the cladding tubes can be prevented from reduction caused by fretting corrosion which is caused by the contact of the cladding tubes with a wrapper tube.

12 Claims, 6 Drawing Figures

FUEL ASSEMBLY OF FAST BREEDER REACTOR

BACKGROUND OF THE INVENTION

This invention relates to a fuel assembly for a nuclear reactor, and more particularly to a wire spacer fuel assembly for a fast breeder reactor (FBR).

FIG. 1 shows the cross section of a fuel assembly as taken at a certain position in the axial direction thereof. Regarding the coolant temperature within the fuel assembly, reference is made to FIG. 2 which shows the radial distribution of the coolant temperature in an AB-plane in FIG. 1. A peripheral coolant flow channel 102 contacting with a wrapper tube wall 101 faces a fuel pin, being a heating element, 103 on only one side thereof, so that the temperature of coolant flowing therethrough is lower than the temperature of coolant flowing through an inner coolant flow channel 104. This temperature difference increases as the outlet of the coolant flow channel is nearer, and it reaches about 50° C. at the outlet. Therefore, the temperature of the cladding tube of especially the outermost fuel pin exhibits a difference between the wrapper tube side and the side opposite thereto, and both these sides undergo different expansions in the axial direction due to heat and neutron irradiation. As the result, as indicated by broken lines in FIG. 3, the fuel pin 103 which is fixed at the lowermost end only deforms in a bowing deformation towards the wrapper tube wall 101. The clearance between the outermost fuel pin and the wrapper tube wall is to the extent of 1–2 mm with the diameter of a wire spacer included. When, under this condition, the outermost fuel pin is permitted to freely bow, it is subjected to such extent of bending moment that the displacement of the fuel pin amounts to 10 cm at the top thereof. In consequence, the outermost fuel pin is pushed back by the wrapper tube wall and is deformed as indicated by solid lines in FIG. 3. In the illustration, the interaction of the outermost fuel pin with the inner fuel pin is not taken into consideration, and actually the deformations of the fuel pins become more complicated under interaction among the fuel pins. In case where the fuel pins within the fuel assembly are deformed in this manner, the maximum load acts on the top of the outermost fuel pin, and there is the possibility that the external force exerted from the wrapper tube wall will reach above 1 Kg.

It is a factor for the damage of the fuel pin that the external force acts on the fuel pin to deform the section thereof. Moreover, as shown in FIG. 4, the fuel pin 103 and the wrapper tube wall 101 contact without the intervention of a wire spacer 105 on one side of the top of the outermost fuel pin. It is therefore possible that fretting corrosion will take place in this portion and that the wall thickness of the cladding tube will decrease. Furthermore, when the state of contact with the wrapper tube wall differs on both the sides of the upper parts of the fuel pins in this manner, the fuel pin bundle leans onto one side by the diameter of the wire spacer. As the result, the peripheral coolant flow channel facing the wrapper tube wall on the other side becomes extensive, the temperature difference between the coolant flowing through the peripheral flow channel and that flowing through the inner flow channel increases, and the outermost fuel pin is bowed more.

SUMMARY OF THE INVENTION

An object of this invention is to provide a fuel assembly in which when fuel pins are bowed by heat and neutron irradiation under the operation of a nuclear reactor, a fuel pin bundle is restrained from leaning into one direction within the fuel assembly, and the fuel pins are prevented from being damaged by the deformation of fuel pin sections ascribable to external loads acting on the fuel pins or by the decrease of the wall thickness of cladding tubes ascribable to fretting corrosion due to their contact with a wrapper tube.

In order to accomplish the object, this invention increases the wall thickness of cladding tubes at the upper end portions of the outermost fuel pins.

DETAILED DESCRIPTION OF THE INVENTION

Hereunder, this invention will be described in detail in connection with embodiments.

Figure 1:
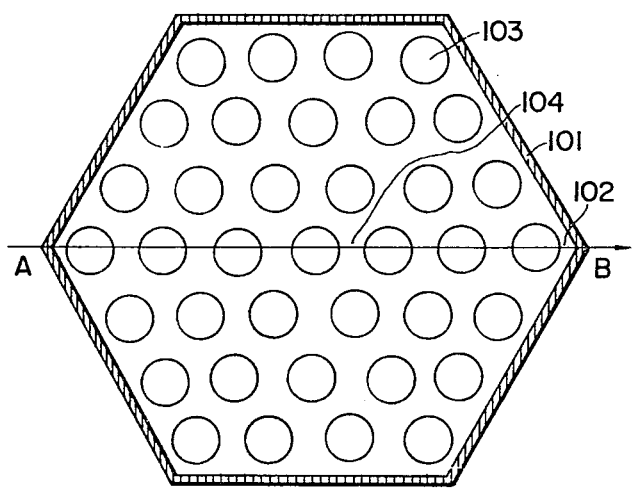
FIG. 1 is a cross-sectional view of a fuel assembly at a certain position in the axial direction thereof.
Figure 3:
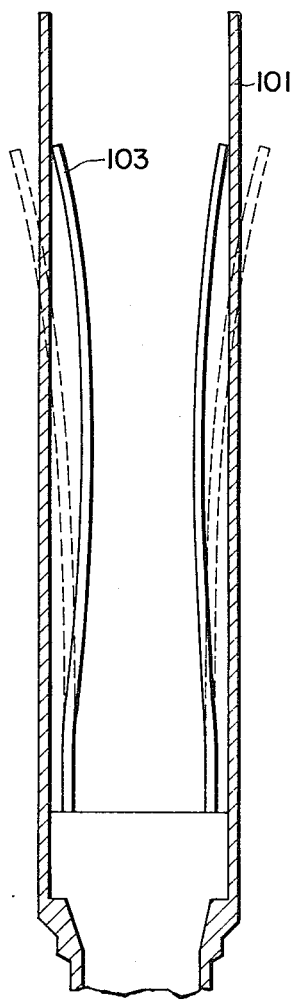
FIG. 3 is a vertical sectional schematic view showing the state of deformation of outermost fuel pins within a fuel assembly.
Figure 2:
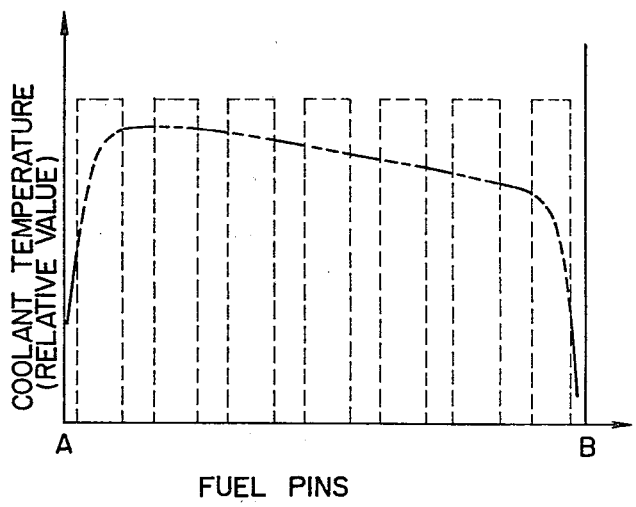
FIG. 2 is a diagram showing the radial distribution of coolant temperatures in an AB-plane in FIG. 1.
Figure 4:
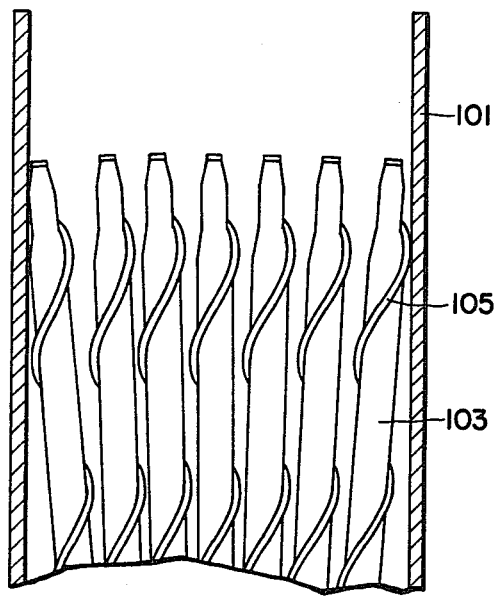
FIG. 4 is a sketch, partly in vertical section, of a fuel assembly and shows the state of contact at the upper end portion of a fuel pin.
Figure 6:
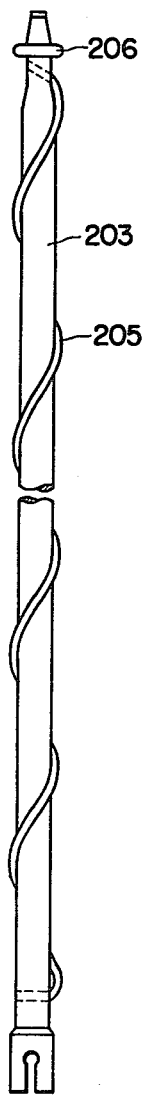
FIG. 6 is a front view of the outermost fuel pin within the fuel assembly shown in FIG. 5.
Figure 5:
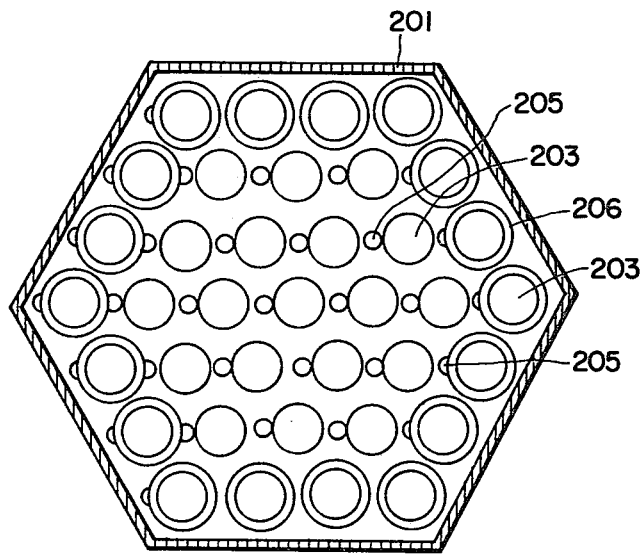
FIG. 5 is a cross-sectional sketch of the upper end portion of a fuel assembly according to this invention.

FIG. 5 shows a cross section of a fuel assembly according to this invention. In this embodiment, the increase of the wall thickness of a cladding tube at the upper end portion of each outermost fuel pin is achieved by mounting a ring spacer on said portion. In the figure, numeral 206 designates a ring spacer, numeral 203 a fuel pin, numeral 205 a wire spacer, and numeral 201 a wrapper tube. FIG. 6 is a front view of the outermost fuel pin within the fuel assembly. Owing to the ring spacer attached to the top or the upper end portion of the fuel pin, the sectional deformation of the fuel pin attributed to an external load is prevented. Simultaneously therewith, the direct contact between the cladding tube of the fuel pin and the wrapper tube wall at the upper end portion of the outermost fuel pin as illustrated in FIG. 4 is avoided, so that the fretting corrosion of the cladding tube is prevented. Further, the outermost fuel pins have their upper ends brought into contact with the wrapper tube through the ring spacers on all sides of the wrapper tube wall, so that the leaning of the fuel pin bundle into one direction can be lessened.

The ring spacer is mounted on a gas plenum portion at the top of the fuel pin, not on a heat generating portion charged with fuel pellets as corresponds to the central part of the fuel pin, so that the width of temperature rise in the cladding tube at the top of the fuel pin is small. When the same material is employed for the ring spacer and the cladding tube, any compressive load on the cladding tube as otherwise caused by the difference of the expansions of both the members does not arise.

Moreover, since the ring spacers are provided on only the outermost pins, their influence as a flow resistance to the coolant flowing within the fuel assembly is little as a whole. According to the present embodiment, the fuel assembly of this invention can be readily fabricated in such a way that the fuel pin with the ring spacer attached to the top portion thereof is used as the outermost fuel pin.

On the other hand, the fuel assembly of this invention can also be performed in such a way that the cladding tube itself is thickened into the salient form at a ring spacer position in FIG. 6 and that the resultant fuel pin is arranged in the peripheral region of the assembly.

As set forth above, according to the fuel assembly of this invention, the wall thickness of the cladding tube at the top or upper end portion of the outermost fuel pin is increased as compared with that at the remaining portion thereof whereby in case of the bowing deformation of the fuel pin, the fuel pin bundle within the fuel assembly is restrained from leaning, and simultaneously, the section of the cladding tube is prevented from being deformed by the external load acting on the fuel pin and the fretting corrosion of the cladding tube at the top of the fuel pin is avoided, so that the damage of the fuel pin can be prevented.

I claim:

1. A nuclear reactor fuel assembly comprising, a wrapper tube for flowing coolant therethrough, a plurality of cladding tubes filled with fuel material, said cladding tubes being provided with wound wire spacers and arranged within said wrapper tube, spacing means mounted at upper end portions of said cladding tubes which are adjacent to said wrapper tube for keeping said cladding tubes from contact with said wrapper tube during the reactor operation.

2. A nuclear reactor fuel assembly as claimed in claim 1, wherein said spacing means are formed by thickening said cladding tubes at said upper end portions to a thickness which exceeds the thickness of remaining portions of said cladding tubes.

3. A nuclear reactor fuel assembly as claimed in claim 1, wherein said spacing means comprise ring-shaped spacers.

4. A nuclear reactor fuel assembly as claimed in claim 1, wherein said spacing means are formed by projections at said upper end portions of said cladding tubes adjacent to said wrapper tube, said projections extending outward beyond remaining portions of said cladding tubes.

5. A nuclear reactor fuel assembly as claimed in claim 1, wherein the nuclear reactor comprises a fast breeder reactor.

6. A nuclear reactor fuel assembly as claimed in claim 1, wherein said spacing means are separate from said wire spacers, and are mounted at said upper end portions of all cladding tubes which are adjacent to said wrapper tube.

7. A nuclear reactor fuel assembly as claimed in claim 1, wherein said spaceing means are mounted at said upper end portions of only thos cladding tubes which are adjacent to said wrapper tube.

8. In a fuel assembly for a nuclear reactor of the type comprising a plurality of cladding tubes filled with fuel material, said plurality of cladding tubes being assembled within a wrapper tube, and said plurality of cladding tubes each being of the type which are helically wound with a wire spacer, the improvement comprising separate spacing means provided at upper end portions of those cladding tubes which are adjacent to said wrapper tube for preventing said cladding tubes from coming into direct contact with said wrapper tube.

9. A fuel assembly according to claim 8, wherein said spacing means comprise ring spacers mounted over said upper end portions of said cladding tubes adjacent said wrapper tube.

10. A fuel assembly according to claim 8, wherein said spacing means comprise upper end portion wall thickness of said cladding tubes which are greater than remaining portions of said cladding tubes.

11. A fuel assembly according to claim 8, wherein said spacing means comprise salient projections at said upper end portions of said cladding tubes.

12. A fuel assembly according to claim 8, wherein said nuclear reactor is a fast breeder reactor.

* * * * *